United States Patent
Pozdeev-Freeman

(10) Patent No.: US 6,185,090 B1
(45) Date of Patent: *Feb. 6, 2001

(54) METHOD FOR DOPING SINTERED TANTALUM AND NIOBIUM PELLETS WITH NITROGEN

(75) Inventor: Yuri L. Pozdeev-Freeman, Keenebunk, ME (US)

(73) Assignee: Vishay Sprague, Inc., Sanford, ME (US)

( * ) Notice: Under 35 U.S.C. 154(b), the term of this patent shall be extended for 0 days.

This patent is subject to a terminal disclaimer.

(21) Appl. No.: 09/146,685

(22) Filed: Sep. 3, 1998

Related U.S. Application Data

(63) Continuation-in-part of application No. 08/790,253, filed on Jan. 29, 1997, now Pat. No. 5,825,611.

(51) Int. Cl.[7] .................................................. H01G 4/06
(52) U.S. Cl. ........................... 361/524; 361/529; 361/540
(58) Field of Search ..................................... 361/524, 529, 361/540, 503, 508–509, 512, 516, 523–525, 528, 531–533; 29/25.03; 427/79, 80, 81, 255

(56) References Cited

U.S. PATENT DOCUMENTS

| | | | |
|---|---|---|---|
| 3,789,274 | 1/1974 | Pfister et al. | 361/532 |
| 4,164,455 | 8/1979 | Aronson et al. | 204/38 |
| 4,621,277 | 11/1986 | Ito et al. | . |
| 5,330,931 | 7/1994 | Emesh et al. | . |
| 5,394,000 | 2/1995 | Ellul et al. | 257/301 |
| 5,452,178 | 9/1995 | Emesh et al. | 361/303 |
| 5,554,870 | 9/1996 | Fitch et al. | 257/334 |
| 5,569,619 | 10/1996 | Roh | . |
| 5,622,746 | 4/1997 | Hahn et al. | 427/79 |
| 5,825,611 | * 10/1998 | Pozdeev | 361/524 |

* cited by examiner

*Primary Examiner*—Anthony Dinkins
(74) *Attorney, Agent, or Firm*—Zarley, McKee, Thomte, Voorhees & Sease

(57) ABSTRACT

Doped tantalum and niobium pellets with nitrogen is described wherein the resulting pellets are substantially free of nitride precipitate on their outer surfaces. The tantalum and niobium pellets are formed by heating the pellets to a temperature of from about 600–1400° C. in a nitrogen gas atmosphere and then in a vacuum which causes nitrogen contacting a pellet to diffuse into the inner portion of the pellet instead of forming a precipitate. The resulting pellets have improved DCL stability and reliability in comparison to prior art nitrogen-doped tantalum and niobium pellets.

5 Claims, 2 Drawing Sheets

METHOD FOR DOPING SINTERED TANTALUM AND NIOBIUM PELLETS WITH NITROGEN

CROSS-REFERENCE TO A RELATED APPLICATION

This application is a continuation-in-part of commonly assigned application, Ser. No. 08/790,293, now U.S. Pat. No. 5,825,611 entitled METHOD FOR DOPING SINTERED TANTALUM PELLETS WITH NITROGEN, filed Jan. 29, 1997, whose disclosure is hereby incorporated by reference.

FIELD OF THE INVENTION

The present invention relates to tantalum pellets used in the manufacture of tantalum and niobium capacitors. In particular, the invention is an improved method of doping tantalum and niobium pellets with nitrogen.

BACKGROUND OF THE INVENTION

This invention relates to an improved method of making tantalum and niobium pellets, and more particularly to the production of such pellets for use in electrolytic capacitors.

The usual method for making tantalum pellets for use in tantalum capacitors includes steps wherein tantalum powder is first pressed or compacted into a pellet. The resulting pressed pellets then undergo a sintering process wherein the pellets are heated in a vacuum. The heating allows the tantalum particles to stick together so they can hold a lead wire.

Following the sintering process, the tantalum pellet is dipped in an acid solution to form a dielectric film on the outer surface of the pellet and the particles within the pellet which is typically tantalum pentoxide. The pellet and the particles within the pellet are then subsequently coated with various other metal-containing materials which form the cathode.

For electrolytic capacitors, the oxygen concentration in the tantalum is critical. When the bulk oxygen content of porous tantalum pellets is above the oxygen solubility limit in tantalum (about 2 at. % at T<873 K), oxide phase precipitates appear on the surface of the particles within the tantalum pellets. These precipitates act as efficient crystallization nuclei and concentrators of the electric field in the amorphous tantalum pentoxide film formed by the subsequent anodization. As the specific volume of the crystal and amorphous phases are different, the crystallization causes disruption of the amorphous tantalum pentoxide film. This renders the dielectric film less reliable and degradation of the capacitor occurs. Capacitors made from such pellets may have unsatisfactory life characteristics. Unfortunately, tantalum powder has a great affinity for oxygen and, thus, the processing steps which involve heating and subsequent exposure to air inevitably results in an increased concentration of oxygen. Since the amount of oxygen absorbed will be proportional to the surface area exposed, fine powders with very high CV properties are even more susceptible to the reaction with atmospheric oxygen.

Methods for reducing the oxygen content of tantalum pellets have included nitrogen doping of sintered tantalum pellets. Nitrogen doping prevents the diffusion of oxygen from the ambient atmosphere and from the tantalum pentoxide film to the tantalum pellet, resulting in stabilization of the chemical composition of the dielectric film. As a consequence, tantalum capacitors made from such pellets have excellent thermostability of DCL and capacitance.

In prior art methods, the sintered pellets after doping with nitrogen consist of a mixture of nitride phase TaN and a solid solution of nitrogen in the tantalum phase. In these methods the nitride phase precipitates on the surface of the pellets to similarly interfere with the tantalum pentoxide dielectric properties as with the oxide phase precipitates. This is due to the surface of the tantalum pellet being oversaturated with nitrogen. It would therefore be beneficial to develop a method of nitrogen doping tantalum pellets to reduce their oxygen content following sintering while also preventing the formation of nitride precipitate.

Niobium is a "daughter" element to tantalum. Niobium and tantalum are often found together and share many of the same chemical and physical characteristics and are difficult to separate. Interest in niobium as a capacitor material is largely based upon its relative abundance compared to tantalum and its lower cost.

The major impediment to the use of niobium in capacitors is the very high rate of oxygen dissolving in niobium metal. This causes the capacitor dielectric niobium oxide to degrade rather quickly at moderately elevated temperatures as oxygen is absorbed into the metal. It would therefore also be beneficial to develop a method of nitrogen doping niobium pellets to reduce their oxygen content following sintering while also preventing the formation of nitride precipitate.

It is therefore a primary object of the present invention to provide a method of reducing the oxygen content of sintered tantalum and niobium pellets.

It is a further object of the present invention to provide a method of doping tantalum and niobium pellets with nitrogen which prevents the formation of a nitride precipitate on the surface of the tantalum or niobium pellet.

It is yet a further object of the present invention to provide an improved nitrogen-doped tantalum or niobium pellet with improved DCL characteristics and reliability.

It is still a further object of the present invention to provide an improved nitrogen-doped tantalum or niobium pellet which is easy to make and economical to manufacture.

The method of accomplishing these and other objects will become apparent from the following description of the invention.

SUMMARY OF THE INVENTION

It is a feature of the present invention to provide a process by which nitride precipitation on tantalum and niobium pellets as a result of nitrogen doping is substantially eliminated. The process involves introducing nitrogen to tantalum and niobium pellets in an oxygen-free environment at a temperature range of from about 600–1400° C. Generally, sintering temperature is higher than nitrogen doping temperature. The preferred temperature range is 700° C.–1250° C. Under these conditions, the absorption of nitrogen by the tantalum or niobium pellet is maximized. In order to prevent nitrogen phase precipitation, the cumulative nitrogen and oxygen content in the volume of nitrogen doped pellets is kept below the solubility limit of these gases in tantalum and niobium at room temperature. These impurities are uniformly distributed in the tantalum and niobium particles due to the annealing in vacuum of the nitrogen doped pellets at the same temperature as the doping temperature. This method of binding the nitrogen to the tantalum or niobium also prevents excessive oxygen levels in the pellet, thus increasing the reliability of the capacitor and reducing capacitor degradation.

DETAILED DESCRIPTION OF THE PREFERRED EMBODIMENT

Figure 4:
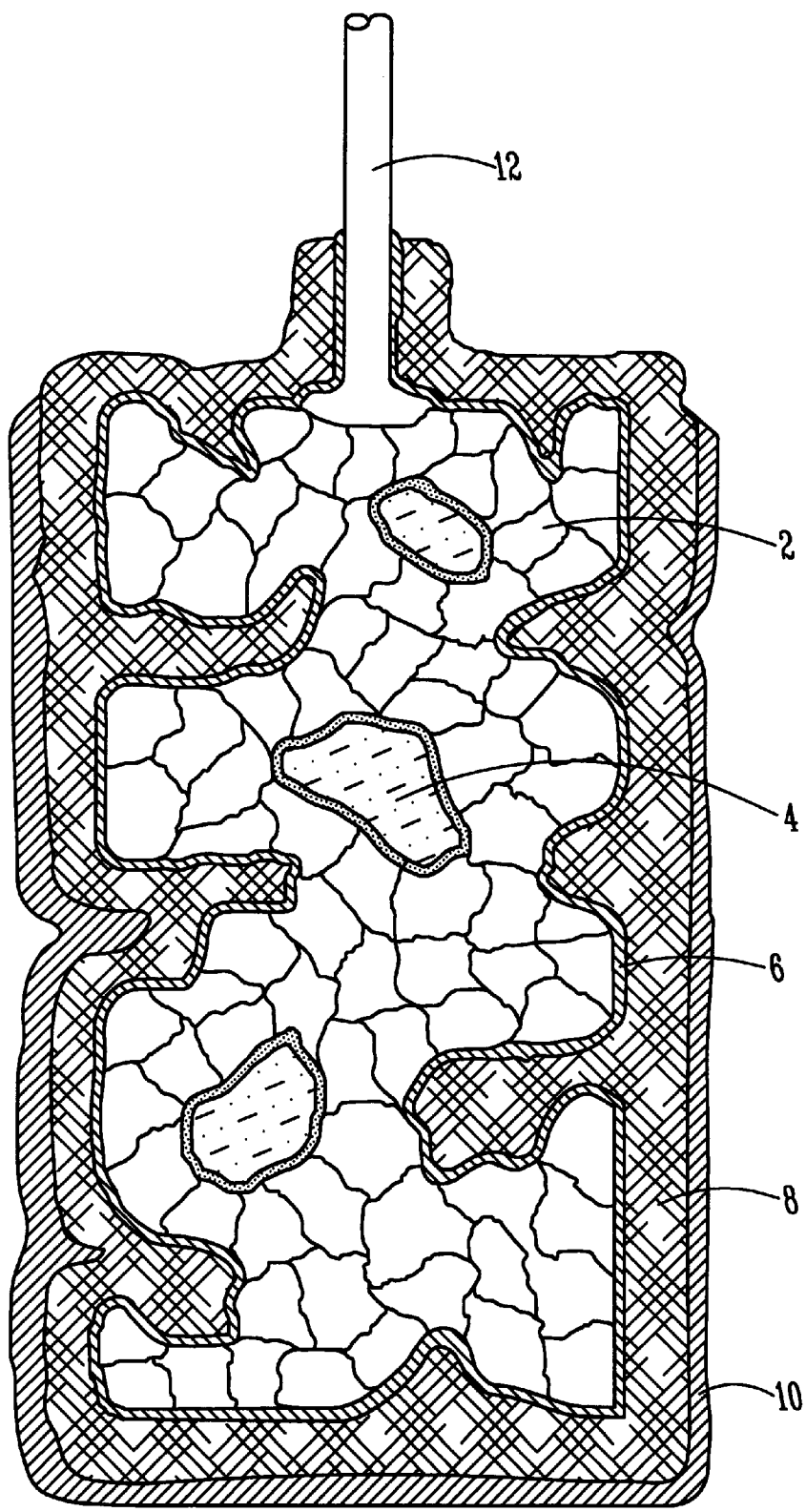
FIG. 4 is a schematic drawing of a tantalum capacitor.

The present invention generally relates to tantalum capacitors, as shown in FIG. 4, or niobium capacitors which are constructed the same as tantalum capacitors with the only difference being the substitution of niobium. Capacitors are used in many types of electronic devices. The more popular uses for tantalum and niobium capacitors are in personal computers, disk drives, cellular phones, printers, hand held pagers, automobiles and in military equipment.

In tantalum capacitors of the instant invention, the two conductors are the tantalum (or niobium) pellet 2 and the manganese dioxide 6, which is actually a semiconductor. The dielectric is tantalum pentoxide 4. When the capacitor is in use, the tantalum 2 is positively charged and acts as the anode, and the manganese dioxide 6 is negatively charged and acts as the cathode. The capacitor also includes a tantalum anode lead wire 12, a metallized outer electrode 10 and a layer of carbon 8 inside the outer electrode 10. Niobium capacitors are identical to tantalum capacitors except a niobium pellet is substituted for the tantalum pellet. In niobium capacitors, the dielectric is niobium pentoxide ($Nb_2O_5$).

In the process of the present invention, either tantalum or niobium powder is first compressed to form porous and sintered pellets and using conventional methods which are well known in the art. The characteristics of the tantalum and niobium pellets are substantially the same, except the density of niobium pellets are about half that of tantalum pellets.

The nitrogen doping procedure of either the tantalum or niobium pellets can be performed either in a sintering furnace while the pellet is in the cooling stage following sintering or in a special furnace. The process must occur in an atmosphere which is substantially free of oxygen and other contaminating gases. Thus, the reaction must occur in a vacuum or in an inert gas. The vacuum level prior to the introduction of nitrogen is about 10 microns or less. The preferred vacuum level is less than 10 microns.

In the process, the pellet is placed in a vacuum furnace at a high temperature, which is preferably in the range of 600–1400° C. for tantalum and niobium pellets. Due to the lower melting point of niobium in comparison to tantalum, the processing temperatures for niobium pellets are about 50° C. lower than those for tantalum.

Nitrogen gas is then introduced into the furnace for a time period of between about 2–20 minutes to cause spontaneous and complete nitrogen absorption during which the vacuum level will rise.

The resulting cumulative nitrogen and oxygen bulk content in the pellets after nitrogen doping is in the range of about 1.8–2 at. % based upon the weight of tantalum or niobium powder. This value is near the solubility limit of these gases in tantalum and niobium at room temperature.

The tantalum or niobium pellets are held in vacuum at the specified temperature for between about 2–20 minutes. During this stage, the nitrogen diffuses from the surface of the pellet into the volume of the tantalum or niobium powder particles. Because of this temperature-dependent diffusion process, less nitrogen remains on the surface of the pellet and the nitrogen therefore does not precipitate during the cooling process.

After the nitrogen doping step, the pellets are cooled in accordance with conventional pellet cooling procedures which are well known to those in the art.

The oxygen binding process with free tantalum or niobium pellet surface is the same for nitrogen-doped and undoped pellets. This is an important requirement for further pellet anodization. The role of nitrogen is to prevent oxygen diffusion from the surface to the volume of tantalum or niobium particles during and following high temperature conditions.

When the tantalum or niobium is doped with nitrogen prior to being exposed to oxygen, the tantalum or niobium particles are already partially bound to the nitrogen which inhibits the binding of oxygen. Thus, the oxygen level cannot reach the "critical level".

Doping with nitrogen is performed following sintering. Otherwise, the nitrogen will evaporate from the pellet at the high sintering temperature. It is for this reason that doping of tantalum or niobium powder with nitrogen prior to sintering is not effective.

After the sintering process, the pellet goes through the remaining steps in capacitor formation which are well known to those in the art. Typically, the pellet is placed in an oxygen-forming solution such that a thin dielectric film of tantalum pentoxide or niobium pentoxide, respectively, forms on the outside of the particles in the pellet.

Next, the cathode portion of the capacitor is formed. Typically, manganese oxide is placed around the dielectric film which may be followed by a layer of carbon graphite which is painted with silver. Other conductive polymers such as polypirrolle can also be used in place of manganese oxide.

The porous tantalum or niobium core may contain a lead wire which is usually made of either the tantalum or niobium. The wire is usually coated with an insulating substance such as Teflon.

The following example is set forth for illustrative purposes only and is not intended to limit the present invention in any manner.

EXAMPLE

Nitrogen Doping Procedure

Embedded-type pellets were pressed from Ta powder with CV=12000 $\mu$FV/g and sintered at temperature of approximately 1600° C. by conventional methods. The weight of Ta powder in each pellet is known. According to chemical analyzer data, oxygen content in the same sintered pellet after exposition in air is 1.7–1.8 at. %. This is why actual bulk oxygen content in Ta particles is 1.3–1.4 at. %. The calculated nitrogen content is 0.5 at. %. In this case, cumulative oxygen and nitrogen content will be 1.8–1.9 at. %, which is close to the solubility limit of 2 at. %. From this nitrogen content and complete weight of Ta powder in all pellets the weight of needed nitrogen gas was calculated. This amount of nitrogen gas was closed before pellet sintering.

After sintering of the experimental pellets, the temperature was decreased to approximately 1200° C. and the vacuum valve was closed. The vacuum level prior to introduction of nitrogen gas was less than 10 microns. Nitrogen gas was slowly introduced into the chamber for a few minutes, during which the vacuum level rises to approximately 100 microns. After a few minutes the vacuum pressure returned to the initial level, which indicates complete absorption of nitrogen gas by the pellets.

Figure 1:
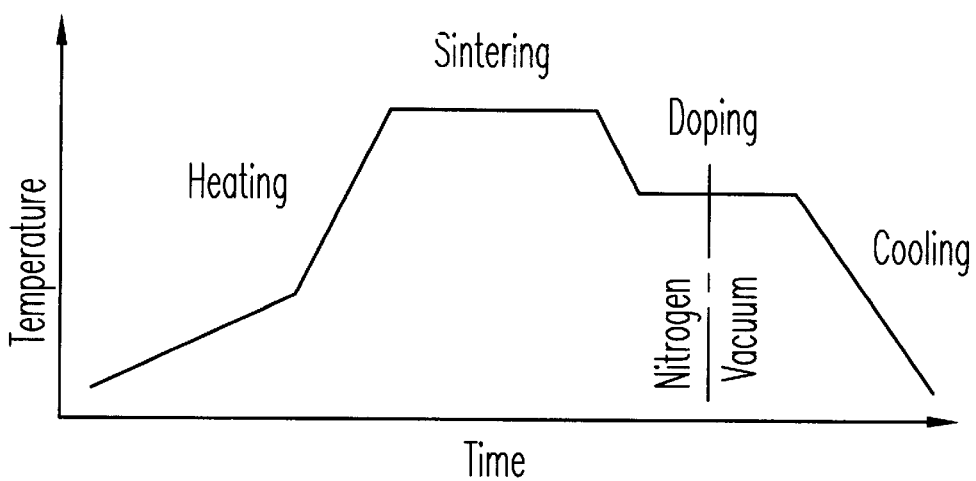
FIG. 1 is a schematic drawing of a preferred embodiment of the joint sintering—nitrogen doping method of the present invention.
Figure 2:
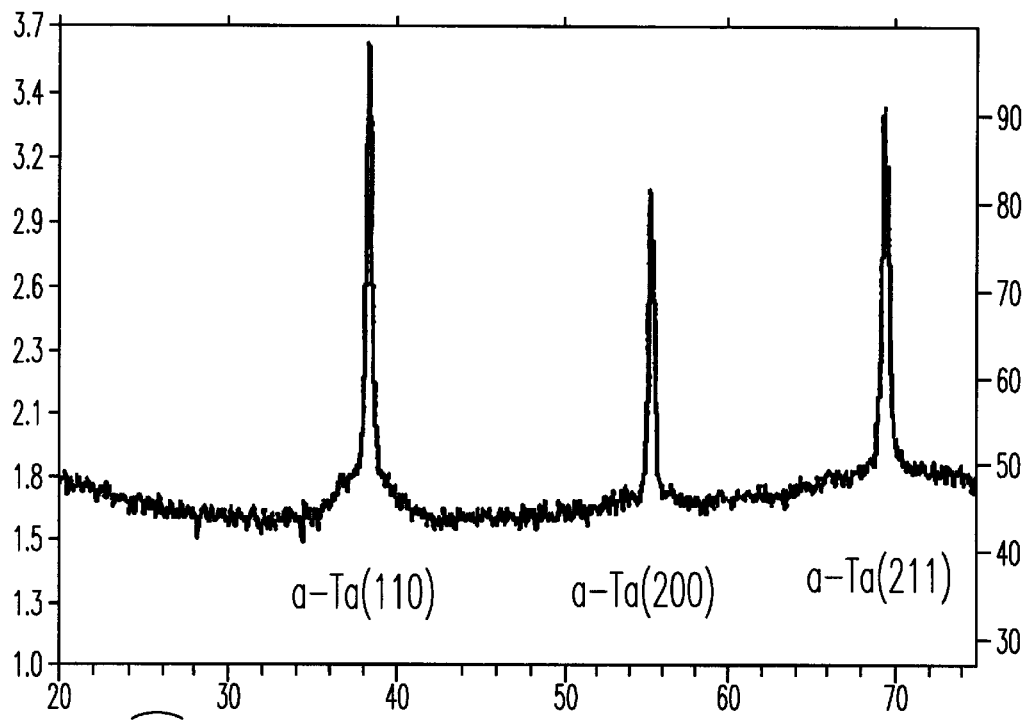
FIG. 2 is a graph showing X-ray analysis results for nitrogen doped pellets of the present invention.

In the second stage, the vacuum valve was opened and the pellets were held in vacuum at the same temperature for a period of a few minutes. During this stage the nitrogen diffuses from the surface layer of the Ta particles to its volume. The pellets were then cooled. The scheme of the joint sintering-doping process is shown in FIG. 2.

The chemical composition of nitrogen doped and undoped (control) pellets are presented in weight % in Table 1. From this, it can be appreciated that additional nitrogen content is about 0.04 weight % or about 0.45 at. % and cumulative oxygen and nitrogen content is about 2.2 at. %. These parameters are close to calculated target composition.

TABLE 1

Oxygen and Nitrogen Content in Nitrogen Doped and Undoped (Control) Pellets

Doped Pellets

| #791 Nitrogen-Dopd | WT = 0.1105 g Chan = method 1 |
| | 12:15 Sep. 18, 1996 |
| Oxygen = 0.1666% | Nitrogen- 0.04489 |
| Cal = 0.9320 Bk = 0.00000 | Cal = 1.2493 Bk = −0.0020 T = 40 |
| T = 40 R = 5286 | P = 232 |
| #792 Nitrogen-2 Dopd | WT = 0.1086 g Chan = method 1 |
| | 12:54 Sep. 18, 1996 |
| Oxygen = 0.1668% | Nitrogen- 0.04336% |
| Cal = 0.9320 Bk = 0.00000 | Cal = 1.2493 Bk = −0.0020 T = 40 |
| T = 40 P = 5123 | P = 225 |
| #793 Nitrogen-3 Dopd | WT = 0.1103 g Chan-method 1 |
| | 12:57 Sep. 18, 1996 |
| Oxygen = 0.1611% | Nitrogen = 0.04646% |
| Cal = 0.9320 Bk = 0.00000 | Cal = 1.2493 Bk = −0.0020 T = 40 |
| T = 40 P = 4821 | P = 203 |

Control Pellets

| #794 Reference- | WT = 0.1018 g Chan = method 1 |
| | 13:03 Sep. 18, 1996 |
| Oxygen = 0.1637% | Nitrogen = 0.00662% |
| Cal = 0.9320 Bk = 0.00000 | Cal = 1.2493 Bk = 0.00020 T = 40 P = 13 |
| T = 40 P = 4317 | |
| #795 Reference- | WT = 0.1006 g Chan = method 1 |
| | 13:06 Sep. 18, 1996 |
| Oxygen = 0.1644% | Nitrogen = 0.00705% |
| Cal = 0.9320 Bk = 0.00000 | Cal = 1.2493 Bk = 0.00020 T = 40 P = 16 |
| T = 40 P = 4700 | |
| #796 Reference- | WT = 0.1006 g Chan = method 1 |
| | 13:09 Sep. 18, 1996 |
| Oxygen = 0.1644% | Nitrogen = 0.00737% |
| Cal = 0.9320 Bk = 0.0000 | Cal = 1.2493 Bk = −0.0020 T = 40 P = 16 |
| T = 40 P = 4683 | |

Figure 3:
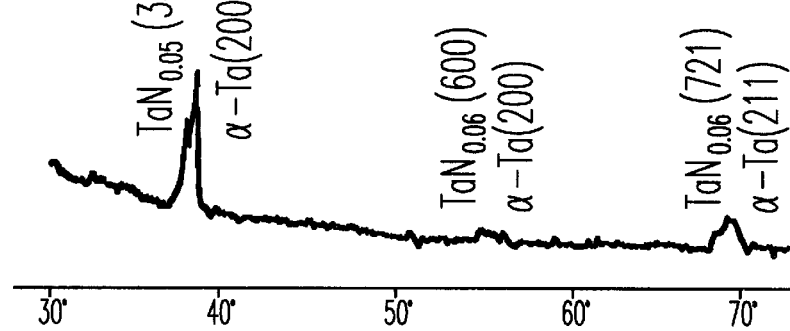
FIG. 3 is a graph showing X-ray analysis of prior art tantalum nitride anodes.

The phase compositions of the pellets doped with nitrogen according to the present invention and according to prior art are shown in FIGS. 3 and 4. These Figures demonstrate that prior art doped pellets contain a precipitated nitride phase while nitrogen doping in accordance with the present invention prevents this nitride phase precipitation.

Nitrogen doped and undoped pellets were used for the manufacturing of solid tantalum capacitors rating 1 $\mu$F–35 V. These capacitors were subjected to a sweep voltage test (Table 2) and negative polarity test (Table 3). Sweep voltage test results (Table 2) demonstrate that all capacitors with doped pellets bear voltage V=99.9 V, while 10 from 12 control capacitors are broken at this voltage. Negative polarity test results (Table 3) demonstrate that all capacitors with nitrogen doped pellets bear negative voltage −10.5V (that is 30% from rated voltage), while in control submission most of capacitors increased sharp DCL value. The results presented in Tables 2 and 3 demonstrate that nitrogen doping of the tantalum pellets according to the present invention causes the electrical strength of the capacitors to rise considerably at direct and negative polarity. This improves the capacitor's reliability and DCL long time stability. No one failure was detected after 1000 hour Life test of 96 experimental capacitors at rated voltage and 85° C., while several failures were detected in reference capacitors.

TABLE 2

Sweep voltage test results for capacitors with nitrogen doped control pellets

| Report | Test Date: 1996/06/18 |
| | Test Time: 10:14:39 |
| Test Specs | Test Specs |
| C&D parameters: | Z parameters |
| Cap freq = KHz | Z freq = KHz |
| Cap value = 1.00 uF | Z cust1 = 0.00 ohm |
| A_h limit = 0.00 uF | DCL parameters: |
| A_l limit = 0.00 uF | Dcl tv = 99.9 V |
| Df freq = KHZ | Dcl st = 60 sec |
| Df cust1 = 0.00% | Dcl cust1 = 47.57 uA |
| ESR parameters: | |
| Esr freq = KHz | |
| Esr cust1 = 0.00 ohm | |

| TA/N Dcl (uA) | TA - REF Dcl (uA) |
|---|---|
| 15.60 | r:'I' |
| 6.84 | r:'I' |
| 8.98 | r:'I' |
| 3.83 | r:'I' |
| 6.79 | r:'I' |
| 4.98 | r:'I' |
| 4.20 | r:'I' |
| 3.00 | 18.38 |
| 1.93 | 11.50 |
| 9.20 | r:'I' |
| 3.96 | r:'I' |
| 3.30 | r:'I' |

TABLE 3

Negative polarity test results for capacitors with nitrogen doped and control pellets

| Report | Test Date: 1996/06/18 |
| | Test Time: 07:53:17 |
| Test Specs | Test Specs |
| C&D parameters: | Z parameters |
| Cap freq = KHz | Z freq = KHz |
| Cap value = 1.00 uF | Z cust1 = 0.00 ohm |
| A_h limit = 0.00 uF | DCL parameters: |
| A_l limit = 0.00 uF | Dcl tv = −10.5 V |
| Df freq = KHZ | Dcl st = 120 sec |
| Df cust1 = 0.00% | Dcl cust1 = 47.57 uA |
| ESR parameters: | |
| Esr freq = KHz | |
| Esr cust1 = 0.00 ohm | |

| TA/N Dcl (uA) | TA - REF Dcl (uA) |
|---|---|
| 0.073 | −6.84 |
| 0.122 | −31.67 |
| 4.17 | 0.049 |
| 0.171 | −33.54 |
| 0.195 | −46.44 |
| 0.439 | −19.36 |
| 0.098 | −51.20 |
| 1.68 | −'O' |
| 0.049 | −53.69 |
| 0.122 | −73.58 |

The invention has been shown and described above in connection with the preferred embodiment, and it is understood that many modifications, substitutions, and additions may be made which are within the intended broad scope of the invention. From the foregoing, it can be seen that the present invention accomplishes at least all of the stated objectives.

What is claimed is:

1. A nitrogen-doped pellet having an inner portion and an outer surface comprising:
   particles selected from the group consisting of tantalum and niobium; and
   from about 1 atomic % to about 2 atomic % cumulative bulk oxygen and nitrogen content;
wherein the outer surface is substantially free of nitride precipitate.

2. A nitrogen-doped pellet according to claim 1 wherein the oxygen and nitrogen bulk content is about 1.8 atomic %.

3. A niobium capacitor comprising:
   a porous core comprising niobium, nitrogen, and manganese;
   a niobium pentoxide dielectric film on said porous core;
   a layer comprising a conductive polymer on said dielectric film and;
   a layer comprising graphite and silver on said conductive polymer;
wherein said dielectric film is substantially free of nitride precipitate.

4. A capacitor according to claim 3 wherein said core further comprises a niobium wire.

5. A capacitor according to claim 3 wherein the conductive polymer is manganese dioxide.

* * * * *